Jan. 5, 1932.    F. G. HENRY    1,839,920
ARTICLE FEEDING MECHANISM
Filed Jan. 11, 1929    2 Sheets-Sheet 1

FERDINAND G. HENRY,
INVENTOR
BY
ATTORNEY

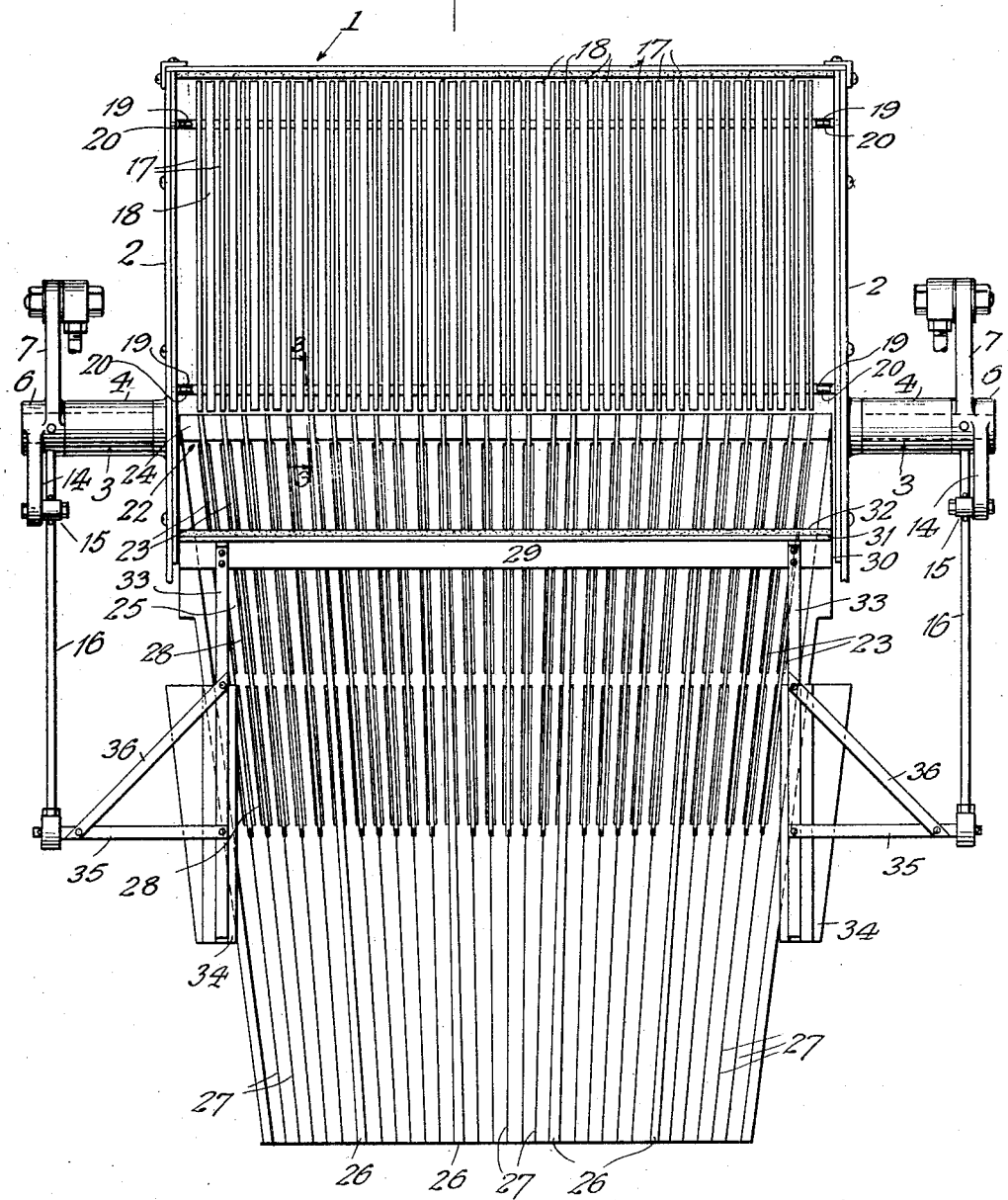

Patented Jan. 5, 1932

1,839,920

UNITED STATES PATENT OFFICE

FERDINAND G. HENRY, OF PHILADELPHIA, PENNSYLVANIA, ASSIGNOR TO E. D. ANDERSON, INC., OF NEW YORK, N. Y., A CORPORATION OF DELAWARE

ARTICLE FEEDING MECHANISM

Application filed January 11, 1929. Serial No. 331,807.

This invention relates to machines for assembling similarly shaped articles into groups.

An object of the invention is to provide a machine for quickly and positively assembling small articles such as sugar tablets into groups for packaging.

Another object is to construct a feeding hopper having relatively small dimensions and a large feeding capacity.

A further object is the provision of a chute for such a machine which will accommodate a plurality of articles positioned side by side, which articles have a fixed average width for a group but which have individually varying widths.

Another object is the provision of a chute for handling sugar which is arranged to prevent clogging initiated by the collection of dust particles from the sugar.

In accordance with my invention I provide a rockable hopper designed to accommodate a quantity of the articles to be assembled. This hopper has a plurality of rails in the bottom thereof for aligning articles while they are in the hopper. A delivery chute is positioned at one side of the hopper which is open so that as the hopper is rocked the articles therein are caused to spill out onto the upper portion of the chute. The articles which have been aligned between the rails in the bottom of the hopper travel endwise between similarly arranged rails in the chute. As the hopper is rocked some of the articles which have been spilled onto the upper part of the chute fall in between the rails thereof and are thereby aligned. In order to push the surplus articles back into the hopper after the hopper is rocked back to its original position I provide a reciprocating partition member which slides up and down the upper part of the chute in step with the rocking motion of the hopper. As this partition pushes the articles back into the hopper it agitates them sufficiently to cause more of the articles to align themselves between the rails of the chute, thereby greatly speeding up the assembling operation of the machine. The partition rests on top of the rails of the chute and serves to tip over any sugar tablets which may be standing on end, so as to make them lie lengthwise in the chute. As the hopper is agitated at a fairly rapid speed the articles are knocked against the walls of the hopper and against the partition. In order to prevent excessive damage to the articles if they be of a frangible nature, such as are sugar tablets, I provide a lining of felt for the back side of the hopper and face of the partition.

The chute in which the articles are aligned and delivered in their assembled position is arranged to accommodate a plurality of groups of articles and to separate these groups slightly upon their movement to the delivery end of the chute so that they may be readily acted upon by a further mechanism, for example, mechanism forming part of a packing machine. Articles such as sugar tablets are of slightly varying widths and it is necessary to construct the spacing rails of the chute at the delivery end so that the assembled articles occupy as small a width as possible and still do not jam in the chute. I accomplish this by providing at the lower end of the chute spacing fingers made of flexible material, such as spring steel or phosphor bronze, which serves properly to space the various articles and still to permit them to be assembled in as small a width as possible. At the outside of the articles at each end of the group I arrange rigid guiding rails which serve to segregate one entire group from its neighbor. While the articles vary slightly in individual dimensions the total overall dimension of different groups of like numbers of articles, will on the average, be substantially a constant. The space between the two rigid rails is made to accommodate this constant width.

The above mentioned and other objects and advantages and the means for obtaining them will be made clear in the following description and accompanying drawings.

In the drawings, Fig. 1 illustrates in side elevation a machine constructed in accordance with my invention.

Fig. 2 is a view showing the hopper with counterweight removed, in its raised position for delivering articles to the chute.

Figure 1:
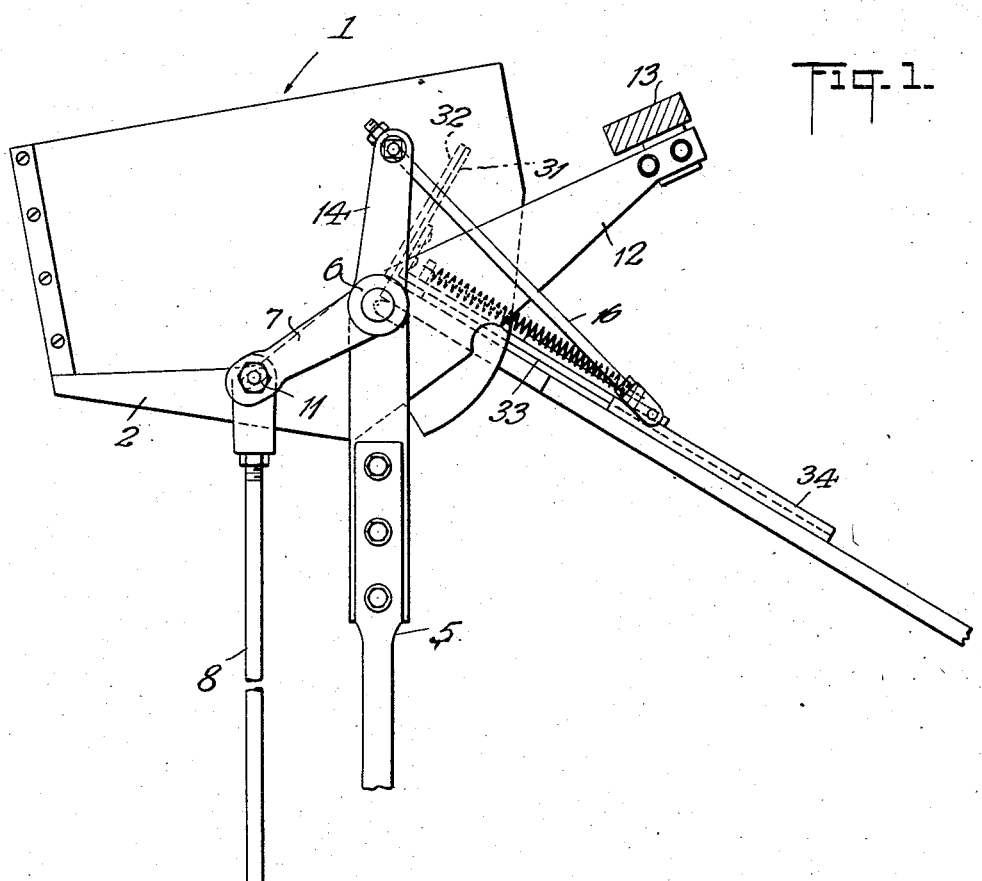
Figure 3:
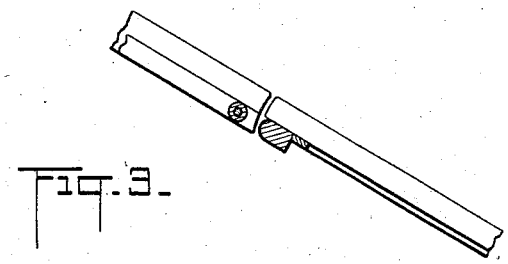
Fig. 3 is a section view taken along line 3—3 of Fig. 2.

Referring more particularly to the drawings, reference numeral 1 indicates a hopper supported by a pair of frame members 2. Each of the frame members has a stub shaft portion 3 journalled in a bearing 4 forming part of a supporting frame 5. Keyed to the end of the shaft 3 is a bell crank 6 having an arm 7 connected with a pitman 8. The pitman 8 connects at its lower end to a crank 9 keyed to a shaft 10 which may be driven by any suitable means. The upper end of the pitman 8 is adjustably coupled to the arm 7 at 11 so that the angle through which the hopper is tilted may be varied at will. The frame members 2 are provided at the front side of the hopper with extensions 12 which serve to support a counterweight 13. The purpose of the counterweight is to balance the load of the hopper so that the work of the pitman is lessened. The bell crank 6 has a second arm 14 which, through an adjustable couple 15 connects to a push rod 16. The bottom of hopper 1 is provided with a plurality of aligning rails 17 and a plurality of supporting bars 18. The rails and the bars are spaced apart by washers 19 and are held together by tie bolts 20. A chute 21 has its upper end 22 positioned at the open side of the hopper adjacent to the ends of the rails 17, and is supported by the frame 5. The chute 21 consists of a plurality of aligning rails 23 held in spaced relation at the upper end by a spacer bar 24 and held in spaced relation at other points by attachment to a bottom plate 25.

The machine which I have illustrated is designed to accommodate thirty rows of articles divided into five groups. In order to arrange the thirty articles into these five groups every sixth aligning rail 26 is made to taper from a narrow width at the upper end of a chute to a greater width at the lower end of the chute. This tapered rail serves to separate the two articles forming ends of adjacent groups so that at the delivery end of the chute each group of articles is spaced from its neighbor. The spacing between the rails 23 is great enough at the top part of the chute to accommodate any ordinary article in spite of the slight variation in dimensions of the article. This space between the rails is appreciably greater than the width of the articles being handled. In some cases the space between the rails may be one and a half times the width of the article. However, at the bottom end of the chute it is necessary to have all the assembled articles positioned in proper alignment and as closely together as possible. In order to accomplish this result the rails 23 at their lower ends are furnished with flexible extension fingers 27 which may be made of spring steel, phosphor bronze or other suitable material. These flexible extensions are secured only to the ends of the rails 23 and are left entirely free from the bottom plate 25 so that they may move sidewise freely.

Certain articles such as sugar tablets are coated with powdered material which has a tendency to collect between the aligning rails 23 and clog the chute. In order to prevent any accumulation which might tend to impede progress of articles in sliding down the chute the bottom plate 25 is slotted adjacent to the aligning rails, as indicated at 28. The slots through the bottom plate permit particles of powdered material which are dislodged from the article during its passage down the chute to escape, thereby insuring free passage of articles between the rails. Most of the powdered material has escaped by the time the articles have reached the flexible extension fingers 27 and hence no slots are provided at the lower end of the bottom plate 25. Any such material as may be present will not be harmful as the fingers 27 are constantly moving slightly during operation of the machine.

For returning the articles spilled from the hopper during the feeding movement thereof and for tipping over articles standing on end between the rails a movable partition 29 is provided. This partition consists of an L shaped plate having a short leg 30 serving as a bearing and a vertical leg 31 forming the partition. The partition front adjacent the hopper is covered with felt or other soft material 32 which prevents the articles from being damaged during agitation in the hopper. The partition 29 has joined thereto guide rods 33 which are slidably positioned in a pair of grooved bearing members 34 which are fastened to the chute in any suitable manner. An arm 35 is secured to each guide rod 33 and supported by a brace 36. To the end of the arm 35 is attached push rod 16 which serves to reciprocate the partition in step with the movement of the hopper. The arrangement is such that as the hopper tips up into alignment with the chute to fit the articles the partition moves down the chute a certain distance, then, when the hopper returns to its initial position the partition moves up the chute far enough to push all of the articles back into the hopper. The function of this reciprocating partition is to permit articles in the hopper and upper end of the chute to have as great a freedom of movement as possible in order to insure alignment of a maximum number thereof between the rails in as short an interval of time as possible. A further function is to cause all articles in the chute to lie lengthwise in the chute. By virtue of the moving partition there are a succession of agitations of the articles and consequently a like number of aligning movements. When the hopper is first tilted up the articles will be moved around to a certain extent causing part of them to drop into the slots between the rails and part of them to be spilled over onto the top part of the chute. This spilling movement causes certain additional articles to be aligned, then as the partition is pushed back to the top of the chute more articles are moved into the correct position and those which have already been placed between the rails tipped over so as to lie lengthwise and slide down the chute to the delivery end. By virtue of the several aligning movements made the feeding hopper can be made relatively small.

In order to prevent crushing of the articles between the ends of the rails in the hopper and the chute the end of the chute and the adjacent ends of the hopper rails are curved. The hopper is arranged to move along the arc of a circle so that no large gap is left between the curved ends of the rail in which articles might be crushed or jammed.

While I have described a particular embodiment of my invention for the purpose of illustration, it will be understood that the invention is capable of various modifications and adaptations and that the invention is to be limited only by the scope of the appended claims.

What I claim is:

1. In an article feeding mechanism, a hopper and an inclined chute, aligning rails in the bottom of both the hopper and the chute, means for tilting the hopper to cause articles therein to align themselves between the rails so as to slide down the chute, a guard plate mounted at an angle to the face of the chute and having one edge closely adjacent thereto but arranged to clear the top of articles properly positioned between the rails, and means for moving the plate up and down the face of the chute towards and away from the hopper.

2. In an article feeding mechanism, an inclined chute, an article hopper rotatably mounted at the high side of the chute, aligning grooves in the bottom of both the hopper and the chute, means for rocking the hopper to spill articles out of the hopper into the chute while at the same time causing the articles to align themselves in the grooves, partition means for preventing articles not properly positioned in the grooves from traveling past a given position on the chute but permitting properly positioned articles to pass, and means for reciprocating said partition longitudinally of the chute in step with the movements of the hopper.

3. In an article feeding machine, an inclined aligning chute, an article hopper rockably mounted adjacent to said chute, means for rocking said hopper to spill articles from the hopper into the chute and means returning some of said articles to the hopper.

4. In an article feeding machine, an aligning chute, an article hopper, means for tilting said hopper to spill articles into said chute, and means for returning unaligned articles to said hopper.

5. In an article feeding machine, an inclined aligning chute, an article hopper tiltably mounted adjacent to the top end of said chute and having an open side directed toward said chute, a partition means for said open side adapted to slide up and down a portion of said chute, means for tilting said hopper to spill articles into said chute against said partition and means for reciprocating said partition means to align articles in said chute and to return unaligned articles to said hopper.

6. In an article feeding machine, a delivery chute comprising a plurality of aligning rails, said rails being widely spaced at one end and narrowly spaced at the other end, the rails at said other end terminating in flexible strips.

7. In an article feeding machine for assembling a plurality of articles side by side, a delivery chute comprising a plurality of rigid, relatively widely spaced aligning rails, placed side by side and terminating in narrowly spaced flexible strips.

8. In an article feeding machine, a delivery chute comprising a bottom plate, a plurality of aligning rails positioned on said plate in spaced relation to form grooves and openings through said bottom plate at the corners of said grooves.

9. In an article feeding machine, a delivery chute comprising a plurality of groups of aligning rails, each of said groups comprising a pair of spaced rails, each rail being narrow at one end and wide at the other, and a plurality of relatively narrow uniform rails positioned between said pair.

10. A device in accordance with claim 9 wherein the relatively narrow uniform rails terminate, adjacent to the wide ends of the pair of rails, in flexible easily displaceable strips.

In testimony whereof, I have signed my name to this specification this 8th day of January, 1929.

FERDINAND G. HENRY.